July 11, 1967   W. D. LUDWIG   3,330,301
SWINGABLE ARMATURE SOLENOID OPERATED ROTARY VALVE
Filed Sept. 23, 1964   3 Sheets-Sheet 1
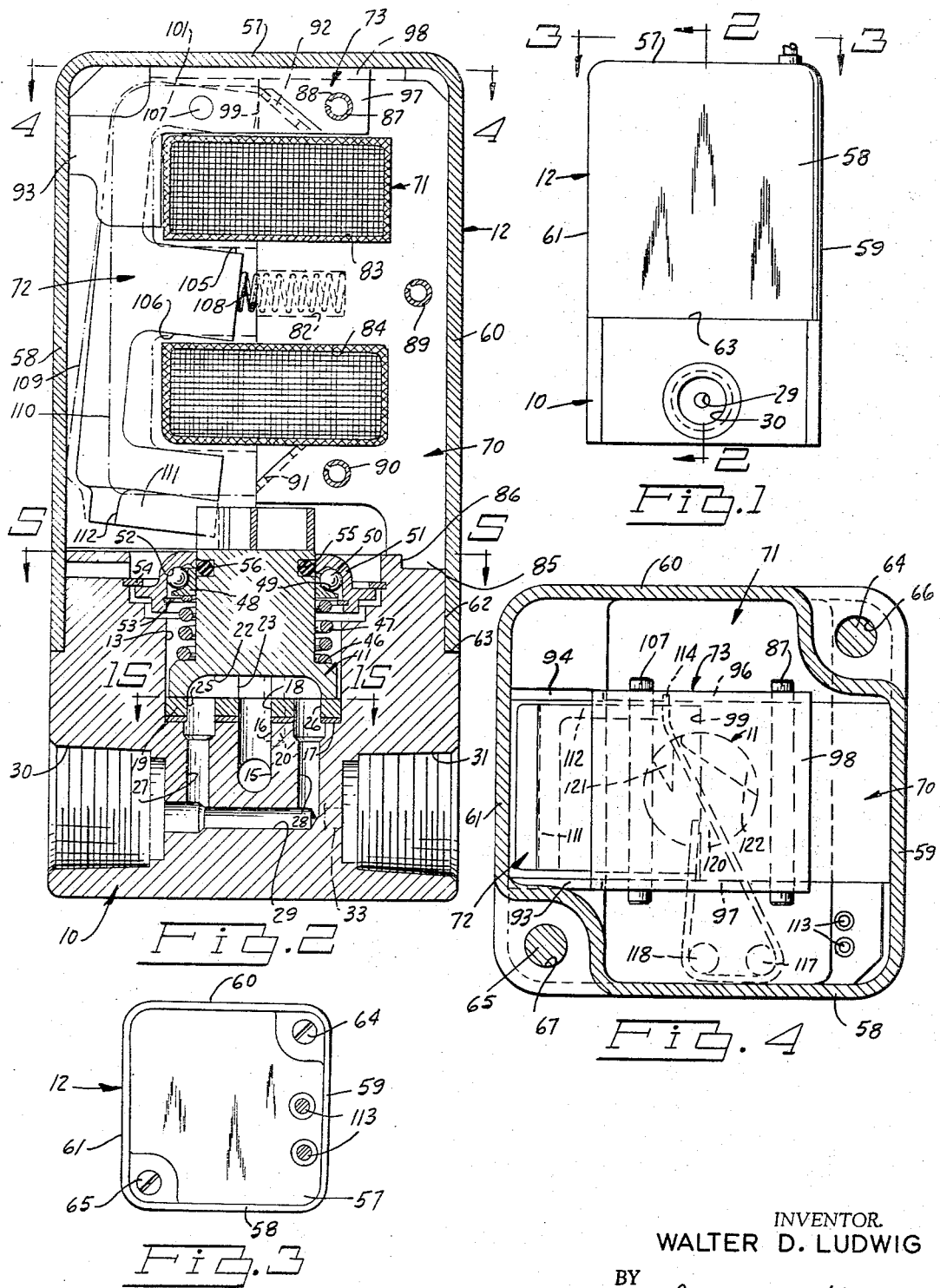
INVENTOR.
WALTER D. LUDWIG
BY
Donnelly, Mentag & Harrington
ATTORNEYS

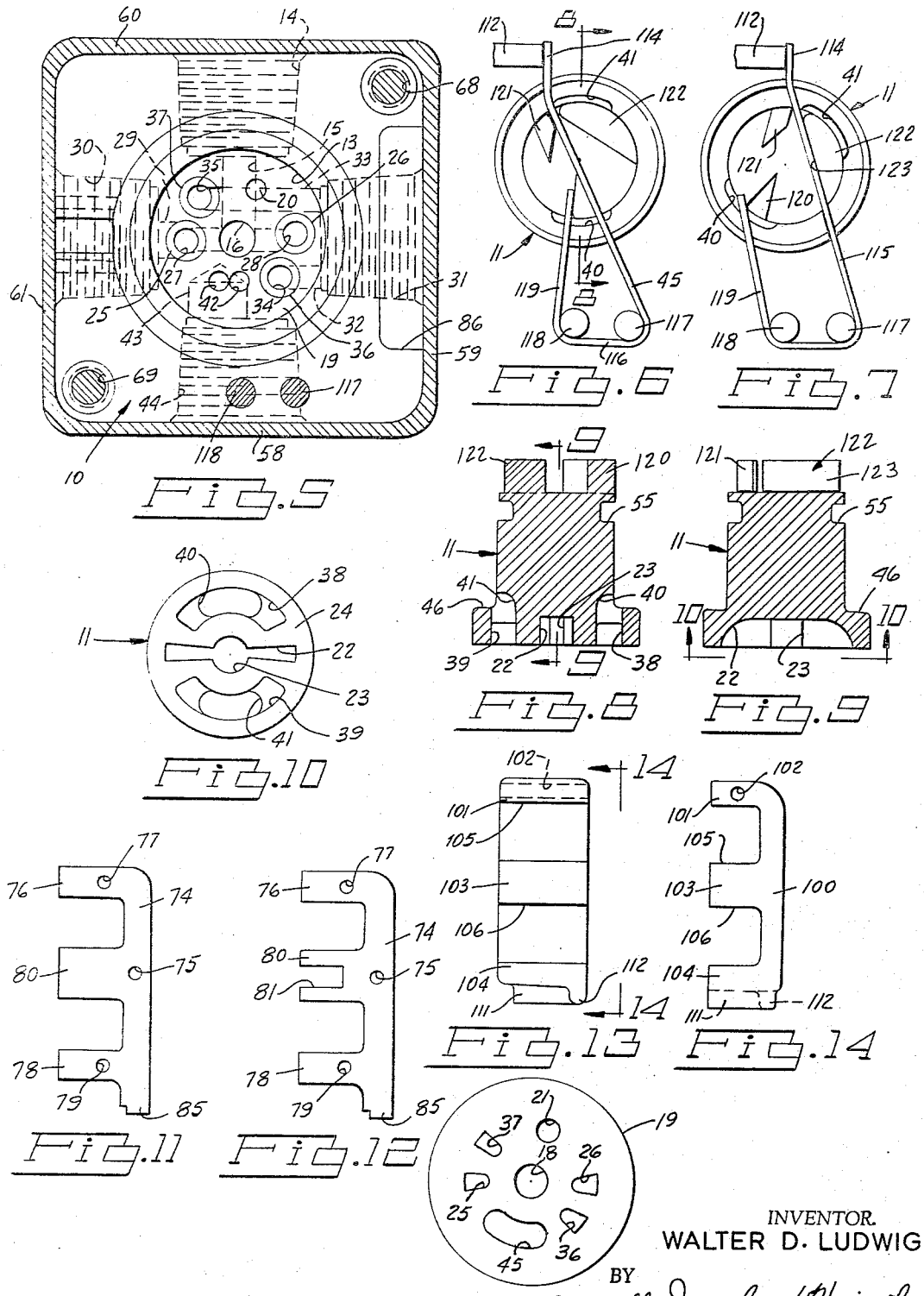

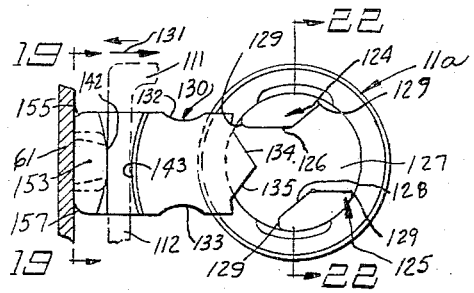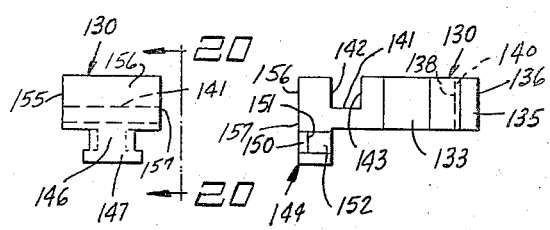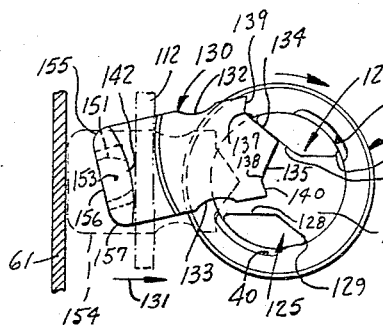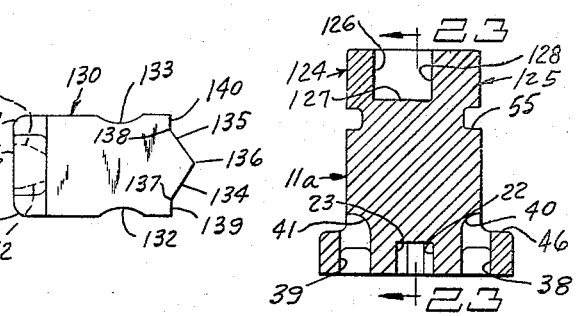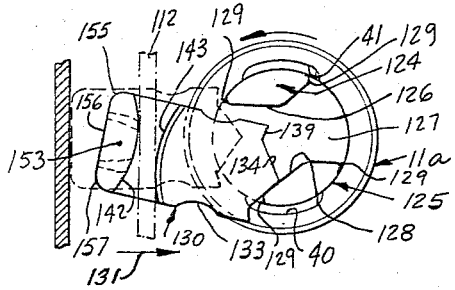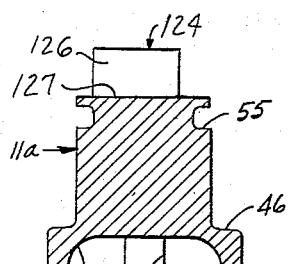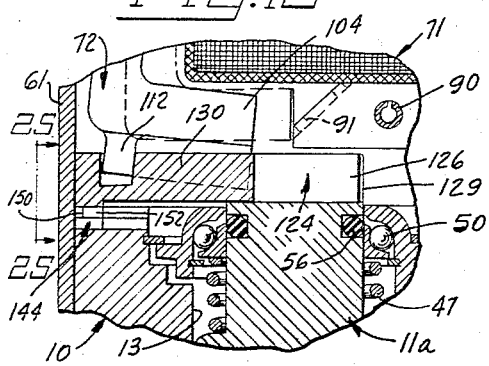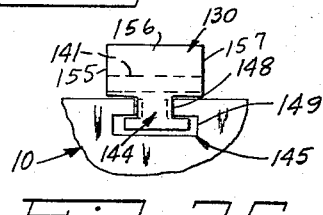

United States Patent Office 3,330,301
Patented July 11, 1967

3,330,301
SWINGABLE ARMATURE SOLENOID OPERATED
ROTARY VALVE
Walter D. Ludwig, Bloomfield Township, Oakland
County, Mich., assignor to Mac Valves, Inc., Oak
Park, Mich., a corporation of Michigan
Filed Sept. 23, 1964, Ser. No. 398,669
18 Claims. (Cl. 137—625.65)

This invention relates generally to pressure fluid valves, and more particularly to a novel and improved reversing rotary valve which is operated by a solenoid embodying a swingable armature.

The prior art reversing rotary valves have a disadvantage in that they are not capable of operating over the entire pressure range which is presently in use in industrial operations employing pressure fluids. For example, it is possible in industry today to employ pressure fluid for control purposes, as for example air, wherein the pressure may range from a vacuum to 150 p.s.i. Under these conditions it is necessary to use many different prior art valves to accommodate the various pressures employed in different control operations. Another disadvantage of the prior art reversing rotary valves is that at least two solenoids are required for momentary operation of the valve wherein the valve is shifted from first position to a second position, and then shifted back to the first position after an interval of rest at said second position. Valves of this type employing more than one solenoid are costly as compared to a single solenoid valve which can accomplish the desired function. Another disadvantage of the prior art reversing rotary valves is that they require a high starting torque due to the friction characteristics of the moving parts of the valves.

In view of the foregoing it is an important object of the present invention to provide a pressure fluid reversing rotary valve of maximum capacity which is solenoid operated and which is constructed and arranged for controlling the flow of any type of pressure fluid throughout the entire range of pressures currently employed by industry for control and power operation purposes. The provision of a reversing rotary valve of this type is accomplished by an improved rotary valve element which has a 360° bearing contact with the valve seat, and a combination spring and anti-friction means for maintaining the rotary valve element in operative contact with the valve seat in control operations for fluids under pressures ranging from vacuum up to and above the maximum pressure employed in present day industry.

It is another object of the present invention to provide a pressure fluid reversing rotary valve of the solenoid operated type which is adapted to be shifted from an initial or first position to a second position, and then back to the initial position by means of a single solenoid. The rotary valve of the present invention is constructed and arranged so that the single solenoid may be momentarily energized to shift the valve element of the rotary valve from a first position to a second position and permit the valve element to remain in the second position while the solenoid is deenergized. The solenoid may again be energized after a predetermined desired interval for shifting the valve element back to the initial or first position.

It is still another object of the present invention to provide a reversing rotary valve which embodies a novel and improved solenoid including a swingable armature which is adapted to operate the rotary element of the valve by means of a first construction wherein the rotary valve element is shifted from an initial position to a second position by the armature and is returned back to the initial position by a return spring, or wherein the solenoid may be adapted by means of a novel apparatus to convert reciprocating linear motion into oscillating rotary motion and shift the rotary valve element through a predetermined shift cycle in an interrupted oscillating rotary manner.

It is still another object of the present invention to provide a novel and improved solenoid operated reversing rotary valve wherein the rotary valve element may be shifted from an initial or first position to a second position and permitted to remain at said second position without the need of having the solenoid energized so as to hold the valve in that position. This construction provides the valve with a built-in safety factor to overcome any possible valve shift due to current failure which would deenergize the solenoid of a spring return type valve.

It is a further object of the present invention to provide a reversing rotary valve including a novel solenoid embodying an improved non-riveted solenoid core made from laminations and retained in a solenoid cover by the coaction of the solenoid coil, a locating bracket and a plurality of roll pins.

It is a still further object of the present invention to provide a novel and improved solenoid operated reversing rotary valve which is capable of momentary actuation and wherein the valve element is adapted to remain in position, after it has been shifted by the solenoid, for an indefinite time before a second solenoid actuation is employed to reverse the valve. The valve of the present invention is adapted to provide unlimited memory operations in logic circuitry with a single operating means, as for example, a solenoid. The valve of the present invention may be used as a fluid pressure pilot control for logic circuits as well as in fluid pressure power circuits.

It is still another object of the present invention to provide a novel and improved reversing rotary valve of the solenoid operated type which is economical of manufacture because of its compactness and relatively small number of parts in comparison with the prior art reversing valves of this class.

It is still a further object of the present invention to provide a reversing rotary solenoid valve which is simple in construction whereby it may be quickly and easily serviced.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is an elevational view of a reversing rotary solenoid four-way valve made in accordance with the principles of the present invention;

FIG. 2 is a partial elevational sectional view of the valve structure illustrated in FIG. 1, taken substantially along the line 2—2 thereof, and looking in the direction of the arrows;

FIG. 3 is a reduced top plan view of the valve structure illustrated in FIG. 1, taken along the line 3—3 thereof, and looking in the direction of the arrows;

FIG. 4 is a horizontal sectional view of the structure ilustrated in FIG. 2, taken along the line 4—4 thereof, and looking in the direction of the arrows;

FIG. 5 is a horizontal sectional view of the structure illustrated in FIG. 2, taken along the line 5—5 thereof, looking in the direction of the arrows, and with some of the valve parts removed;

FIG. 6 is a top plan view of the rotary valve element used in the valve structure illustrated in FIG. 1 and showing the return spring employed in one embodiment of the invention;

FIG. 7 is a view similar to FIG. 6 and showing the rotary valve element shifted from a first position to a second position;

FIG. 8 is an elevational sectional view of the rotary valve element illustrated in FIG. 6, taken along the line 8—8 thereof, and looking in the direction of the arrows;

FIG. 9 is an elevational sectional view of the structure illustrated in FIG. 8, taken along the line 9—9 thereof, and looking in the direction of the arrows;

FIG. 10 is a bottom plan view of the structure illustrated in FIG. 9, taken along the line 10—10 thereof and looking in the direction of the arrows;

FIG. 11 is a side elevational view of a lamination element employed in forming the outer portion of the solenoid core employed in the invention;

FIG. 12 is a side elevational view of an inner lamination employed in the core of the solenoid of the present invention;

FIG. 13 is a front elevational view of the swingable armature employed in the solenoid of the present invention;

FIG. 14 is a side elevational view of the armature structure illustrated in FIG. 13, taken along the line 14—14 thereof, and looking in the direction of the arrows;

FIG. 15 is a top plan view of the valve seat in the valve structure illustrated in FIG. 2, taken along the line 15—15 thereof, and looking in the direction of the arrows;

FIG. 16 is a plan view of a second embodiment of the invention and showing a portion of the valve structure;

FIG. 17 is a view similar to FIG. 16, but showing the rotary valve element rotated from a first position shown in FIG. 16 to a second operative position;

FIG. 18 is a view similar to FIG. 17, but showing the rotary valve element rotated from a first position shown in FIG. 16 to a second operative position;

FIG. 19 is a side elevational view of the structure illustrated in FIG. 16, taken along the line 19—19 thereof, and looking in the direction of the arrows;

FIG. 20 is a side elevational view of the structure illustrated in FIG. 19, taken along the line 20—20 thereof, and looking in the direction of the arrows;

FIG. 21 is a bottom plan view of the structure illustrated in FIG. 20;

FIG. 22 is an elevational sectional view of the structure illustrated in FIG. 16, taken along the line 22—22 thereof and looking in the direction of the arrows;

FIG. 23 is an elevational sectional view of the structure illustrated in FIG. 22, taken along the line 23—23 thereof and looking in the direction of the arrows;

FIG. 24 is a fragmentary elevational sectional view of the second embodiment of the invention; and, FIG. 25 is a fragmentary elevational view of the structure illustrated in FIG. 24, with parts removed, taken along the line 25—25 thereof and looking in the direction of the arrows.

Referring now to the drawings and in particular to FIGS. 1 and 2, the numeral 10 generally indicates the valve body of an illustrative embodiment made in accordance with the principles of the present invention. As shown in FIG. 2, the valve includes a rotary valve element or rotor, generally indicated by the numeral 11, which is adapted to be shifted between operative positions by means of a solenoid, generally indicated by the numeral 12, as described in detail hereinafter.

FIGS. 3, 4 and 5 illustrate the substantially square configuration of the valve as viewed in horizontal cross section. The invention has been illustrated as applied to a four-way reversing valve, but it will be understood that the principle of the present invention may be incorporated in various other types of reversing valves.

As shown in FIG. 2, the rotary valve element 11 is operatively mounted in a cylindrical compartment 13 which is centrally disposed in the valve body 10 and extends inwardly from the upper end thereof. The rotary valve element 11 controls the flow of pressure fluid fed into the passageway 13 by the following described fluid passage structure.

As shown in FIG. 5, the valve body 10 is provided with a pressure fluid inlet port 14 which is threaded and adapted to be connected to a suitable source of pressure fluid. The inner end of the inlet port 14 communicates with the horizontal fluid bore or passageway 15 which in turn communicates with the lower end of the vertically disposed axial passageway 16. As shown in FIG. 2, the vertical passageway 16 terminates at the inner end or bottom of the cylinder compartment 13. Pressure fluid entering the valve body 10 through the last-mentioned passageways passes upwardly through a suitable aperture in the annular gasket 17 and thence through the bore 18 formed in the annular valve seat 19. The gasket 17 and the valve seat 19 are releasably mounted in the lower end of the compartment 13 for service and replacement operations. The gasket 17 and the valve seat 19 are made from any suitable materials. The valve seat 19 is located in place in the compartment 13 by means of the vertically disposed locating pin 20 which has the lower end thereof mounted in a suitable hole in the valve body 10, and the upper end thereof slidably mounted in the vertical hole 21 in the valve seat 19 and extending into the slot 41 of the rotor. FIG. 15 shows the locating pin hole 21.

As shown in FIGS. 2, 8, 9, and 10, pressure fluid passing through the hole 18 in the valve seat 19 is received in the transversely extended, horizontal fluid transfer passage or slot 22 formed in the lower end of the rotary valve element 11. The fluid transfer passage or slot 22 is enlarged at the center thereof as indicated by the circular enlargement 23. As shown in FIG. 10, the lower end of the rotary valve element is provided with a circular seating surface 24 which is adapted to provide a 360° stable bearing contact between the valve element 11 and the mating face of the valve seat 19.

The rotary valve element 11 is shown in the initial or first operative position in FIG. 2, and in this position it is adapted to transfer the pressure fluid from the slot 22 sidewardly and downwardly into the valve body through axially or vertically disposed fluid passageways 27 and 28 by means of the holes 25 and 26, respectively, which latter holes are formed in the valve seat 19. The fluid passageways 27 and 28 communicate at the lower ends thereof with the horizontal passageway 29. As shown in FIGS. 2 and 5, the passageway 29 extends through the valve body 10 in an outward direction and communicates with the inner end of the threaded port 30. The port 30 is adapted to be connected to an apparatus to be supplied with pressure fluid, as for example, one end of a fluid cylinder or some other mechanism in either a pressure fluid power circuit or a pressure fluid control circuit. The port 30 may be termed a normally "open" port.

When the rotary valve element 11 is in the initial or first operative position shown in FIG. 2, it is also adapted to exhaust pressure fluid from the end of a fluid cylinder opposite to the end into which it is feeding pressure fluid through the port 30. As shown in FIGS. 2 and 5, the valve body 10 is provided with what may be termed a normally "closed" port 31 which is threaded and may be connected to said cylinder end to be exhausted or to any other device in a pressure fluid power or control circuit. As shown in FIG. 5, the normally closed port 31 communicates with the valve element 11 through the inwardly extended horizontal fluid passageways 32 and 33 which communicate in turn with the vertically extended fluid passageways 34 and 35, respectively. The vertical fluid passageways 34 and 35 communicate with the holes 36 and 37, respectively, in the valve seat 19.

As shown in FIGS. 8 and 10, the rotary valve element 11 is provided with a pair of diametrically opposite arcuate exhaust slots or passageways, indicated by the numerals 38 and 39, which are adapted to receive the exhausting fluid from the valve seat holes 36 and 37, respectively. The slots 38 and 39 communicate with the valve compartment 13 by means of the communicating openings 40 and 41 formed in the valve element 11. The exhausting fluid passing into the slot 38 is conducted directly to the vertically disposed exhaust passageways 42 which terminate at the lower ends thereof at openings which communicate with the horizontal passageway 43. The passageway 43 communicates with the inner end of the exhaust port 44 which may be either connected to a suitable fluid storage tank or to the atmosphere, as desired. The fluid exhausting into the exhaust passageway 39 passages upwardly through the opening 41 and into the compartment 13, and thence into the opening 40 and into the slot 38 and out through the exhaust port 44. It will be seen that when the rotary valve element 11 is turned clockwise, as viewed in FIG. 7, the fluid pressure inlet transfer passage 22 will be disposed in communication with the valve seat openings 36 and 37 to feed pressure fluid to the normally closed port 31 and to reverse the aforedescribed exhaust system to exhaust the fluid from the normally open port 30 which is then acting as an exhaust port. As shown in FIG. 15, the valve seat 19 is provided with an arcuate opening 45 which communicates the exhaust passages 42 with the compartment 13.

The rotary valve element 11 is held in operative engagement with the surface of the valve seat 19 by the following described combination spring and anti-friction bearing means. As shown in FIG. 2, the upper end of the rotary valve element 11 is provided with a reduced cylindrical shape which terminates at the lower end thereof at the shoulder 46. A heavy duty coil spring 47 is telescopically mounted about the reduced upper end of the rotary valve element 11 and has the lower end thereof seated on the annular shoulder 46. The upper end of the spring 47 bears against the lower side of the inner bearing race ring 48. The bearing race ring 48 is provided with a ball bearing seat 49 on which is rollably mounted a plurality of ball bearings 50 which are preferably laterally spaced apart from each other by any suitable means to permit optimum rolling low friction bearing action. A cup-shaped annular retainer 51 is mounted around the upper end of the rotary valve element 11 and is provided on the inner surface thereof with the outer bearing race ring 52. The bearing races 48 and 52 coact with each other and with the ball bearings 50 to provide a combined anti-friction bearing means for taking up the radial and end thrust bearing loads on the valve element 11. The rolling line of contact of the ball bearing balls 50 with the bearing races 48 and 52 is such that a line drawn through the bearing point contacts would extend outwardly in a direction approximately 45° from the rotational axis of the valve element 11, as viewed in FIG. 2.

As shown in FIG. 2, the inner bearing race ring 48 is secured in place in the outer race cup retainer 51 by means of the releasable snap retainer ring 53. A similar snap retainer ring 54 is adapted to releasably retain the outer race cup retainer 51 in the upper stepped end of the cylinder compartment 13.

Pressures encountered in the industry at the present time range from a vacuum to approximately 150 p.s.i. It will be understood that the hold down spring 47 may be made to any strength requirements for operating in the aforementioned pressure range. Actual experience shows that a valve of the present invention may be provided with a suitable spring to permit it to operate at pressures higher than 150 p.s.i. Although the antifriction means is illustrated as comprising a plurality of ball bearings 50, it will be understood that other antifriction means may be used, as for example, roller bearings or the like. It will also be seen that friction between the moving parts of the aforedescribed valve structure is confined to one surface, namely, the surface between the valve element 11 and the valve seat 19. The novel construction of the valve of the present invention substantially reduces the torque required to rotate the valve element 11 as compared to prior art reversing rotary valves of the type illustrated in this application. It will be seen that the locating pin 20 is adapted to extend upwardly into the fluid passageway 41 for limiting the reciprocating rotary path of the valve element 11.

The solenoid 12 includes a housing or cover which is substantially square in cross section and which includes the top wall 57, and the side walls 58, 59, 60 and 61. As shown in FIG. 2, the solenoid cover is open at the lower end thereof and is adapted to be telescopically mounted over the upper reduced end 62 of the valve body 10 and to seat on the shoulder 63. As shown in FIGS. 3, 4 and 5, the solenoid cover is adapted to be releasably secured to the valve body 10 by any suitable means as by the pair of screws 64 and 65 which extend down through the holes 66 and 67, respectively, in the upper end of the cover, and thence downwardly into threaded engagement with the holes 68 and 69, respectively, in the upper end of the valve body 10.

The stationary structure of the solenoid 12 comprises the E-shaped core, generally indicated by the numeral 70, and the channel bracket generally indicated by the numeral 73. The core 70 and bracket 73 coact to operatively hold the coil 71 and a swingable E-shaped armature 72 in operative positions in the solenoid housing. The core 70, bracket 73, and coil 71 are retained in the solenoid housing without the use of any rivets or any screws.

The core 70 is made from a plurality of laminations of the type illustrated in FIGS. 11 and 12. The core laminations may be made from any suitable materials, as for example, from No. 26 gauge transformer type silicon steel. The outer one-third on each side of the core is made from the laminations illustrated in FIG. 11, and the inner one-third is made from laminations of the type illustrated in FIG. 12. As shown in FIGS. 11 and 12, each of the core laminations includes the elongated portion 74 which is provided with the central hole 75 and the perpendicular outwardly extended legs 76 and 78 in which are formed the holes 77 and 79, respectively. The core laminations are further provided with the perpendicular outwardly extended central or intermediate leg 80 which is evenly spaced from the two legs 76 and 78. The core laminations used in the middle portion of the core are of the type shown in FIG. 12 wherein the intermediate leg 80 is provided with the recess 81. The recesses 81 in the central laminations coact to form a return spring chamber or recess 82, as shown in FIG. 2. As shown in FIG. 2, the legs 76, 80 and 78 of the core laminations coact to form the coil mounting slots 83 and 84. As shown in FIGS. 2, 5, 11 and 12, the core laminations are provided on the lower ends thereof with the projection 85. The projections 85 extend downwardly and are adapted to be seated in the locating slot 86 which is formed in the upper side of the valve body 10. The locating slot 86 is disposed along one side of the valve body 10 as shown in FIG. 5.

As shown in FIGS. 2 and 4, the U-shaped or channel-shaped stationary bracket 73 is mounted over the upper end of the core 70 and is secured thereto by means of the roll pin 87. The roll pin 87 is a tubular member which is slotted along one side thereof as indicated by the numeral 88 in FIG. 2. The roll pin 87 extends through the holes 77 in the upper ends of the core laminations. A pair of similar roll pins 89 and 90 are adapted to retain the lower ends of the core laminations together. The roll pins 89 and 90 are adapted to be operatively mounted in the holes 75 and 79, respectively, in the stacked core laminations.

As shown in FIG. 2, the core 70 is provided with a pair of rectangularly shaped shading coils 91 and 92 which are mounted in suitable slots on the inner corners of the lamination legs 76 and 78. The coil 71 is an encapsulated coil, and as shown in FIG. 4 it engages the inner sides of the solenoid cover walls 58 and 60 and functions to locate the core 70 in the solenoid housing.

As shown in FIG. 4, the supporting bracket 73 is provided with a pair of laterally and outwardly extended legs 93 and 94 which engage the inner surface of the housing wall 58. It will be seen that the roll pin 87 exerts a sidewardly outward force so as to maintain the core 70 against the inner surface of the housing wall 59, and the ends of the channel legs 93 and 94 against the inner surface of the housing wall 61. The coil 71 functions to abut the inner surfaces of the housing walls 58 and 60 and center the core 70. The coil 71 is secured in place in the core 70 by the channel legs 93 and 94.

As shown in FIG. 4, the stationary bracket 73 includes the vertical spaced apart side walls 96 and 97 which are disposed on opposite sides of the core 70 and which are integral with the horizontal upper wall 98. As shown in FIG. 2, the bracket or channel wall 98 abuts the inner surface of the housing top wall 57 to axially locate the core 70 and coil 71 in the solenoid housing. The aforedescribed bracket legs 93 and 94 comprise integral sidewardly extended portions of the channel walls 97 and 96, respectively. The roll pin 87 extends through the channel bracket side walls 96 and 97.

As shown in FIGS. 2 and 4, the top legs of the core 70 extend into the bracket 73 to a position indicated by the numeral 99. As shown in FIG. 2, the coil 71 extends sidewardly outwardly beyond the terminating edge 99 of the core 70. The core 70 and coil 71 coact with the swingable armature 72 in the following described manner.

As shown in FIGS. 2, 13 and 14, the swingable armature 72 is a three legged or E-shaped armature which is of a solid cast construction. The armature 72 comprises the elongated portion 100 which is provided at the upper end thereof with the perpendicularly outward extended mounting leg 101 having the hole 102 formed sidewardly therethrough. As shown in FIG. 2, the armature leg 101 is movably disposed between the mounting bracket legs 93 and 94 and is swingably secured to the bracket 73 by means of the solid pin 107. The armature 72 further includes the intermediate perpendicularly outwardly extended leg 103 and a similar lower end leg 104. The leg 103 is evenly spaced apart from the armature legs 101 and 104 to provide the coil receiving slots 105 and 106. As shown in FIG. 2, a coil spring 108 is mounted in the spring slot 82 in the core 70 and is adapted to normally bias the armature 72 outwardly, or to the left as viewed in FIG. 2, against the housing wall 58. The dotted line 109 in FIG. 2 indicates the position of the solenoid 72 when it has been swung outwardly against the housing wall 58. The solid line position of the armature 72 in FIG. 2 indicates an intermediate position between the fully retracted position 109 and the fully advanced position indicated by the dotted line 110. It will be understood that the solenoid armature 72 is constructed so as to have sufficient clearance for the inward and outward swinging action, as more fully described hereinafter.

The swingable armature 72 is adapted to rotate the rotary valve element 11 between the initial or first operative position of FIG. 6 and the second operative position of FIG. 7 by means of the following structure. As shown in FIGS. 2, 4, 13 and 14, the armature 72 is provided on the lower end thereof with an L-shaped, downwardly extended projection comprising the first portion 111 which is disposed parallel to the armature pivot pin 107, and the second portion 112 which is disposed perpendicularly to the pivot pin 107. As viewed in FIG. 2, it will be seen that the armature 72 is adapted to swing inwardly when the solenoid is energized and rotate the rotary valve element 11 clockwise, and to be retracted by means of the return spring 108 when the solenoid is deenergized. The solenoid projection 112 is disposed parallel to the plane of the swinging movement of the armature 72. The armature projection 111 is disposed perpendicular to such armature travel. As shown in FIG. 3, the armature coil 71 is provided with suitable electric lead wires indicated by the numeral 113.

As shown in FIGS. 4, 6 and 7, the rotary valve element 11 is provided with a spring and lug structure which coacts with the armature projection 112 for rotating the valve element between the initial or first position of FIGS. 2 and 6 and the advanced or second adjusted position of FIG. 7. As shown in FIG. 6, the armature projection 112 is adapted to abut the outer end 114 of the leaf spring 115 when the armature 72 is in the retracted position indicated by the numeral 109 in FIG. 2. The spring 115 extends over the top of the rotor 11 and has the end portions 116 and 119 folded about the two laterally spaced apart anchor pins 117 and 118. The anchor pins 117 and 118 are mounted in the upper side of the valve body 10. As shown in FIG. 6, the end of the spring portion 119 is folded or bent toward the main portion of the spring 115 and into engagement with one side of the triangularly shaped lug 120. The other side of the lug 120 is engaged by the spring 115. The lug 120 is integrally formed on the upper end of the rotary valve element 11. The rotary valve element 11 is provided with two other upwardly extended lugs 121 and 122. As shown in FIG. 6, the lug 121 is provided with a vertical flat side against which the spring 115 abuts when the valve element is in the retracted position. The lug 122 is positioned in a spaced apart relationship with the lug 121, and is constructed to have a substantial line contact with the opposite side of the spring 115. The lug 122 is provided with a vertical face 123 which is disposed in an angular position relative to the spring 115 when the valve element 11 is in the initial or retracted position of FIG. 6. When the solenoid 12 is energized, the swingable armature will move inwardly or to the right as shown in FIG. 2, and the projection member 112 or pusher element will move the spring portion 114 to the right to the position as viewed in FIG. 7. The spring portion 115 engages the lug 122 on the top of the rotor 11 and cams the rotor 11 about its axis until the spring 115 abuts the vertical face 123 of the lug 122. Upon deenergization of the solenoid, the spring 115 mounted around the lug portions 120, 121 and 122 functions to return the rotary valve element 11 to the starting position shown in FIG. 6. The spring return function is caused by the spring portions 115 and 119 tending to return to their initial positions of FIG. 6.

FIGS. 16 through 25 illustrate a second embodiment of the invention which is capable of providing a momentary actuation with a single solenoid. Heretofore, such momentary actuation has been carried out with double solenoid valves wherein one of the solenoids is momentarily actuated to shift the valve element in one direction and then deenergizing said one solenoid to let the valve rest in the shifted position. The second solenoid is then used to shift the valve element back to the initial position.

In accordance with the principles of the second embodiment, the rotary valve element is provided with a pair of upwardly extended lugs 124 and 125 which are formed differently than the lugs adapted for use with the aforedescribed first embodiment. The rotary valve element of the second embodiment has been marked with the reference numeral 11a since it is constructed the same as the rotary valve element 11 with the exception of the lugs 124 and 125. The rotary valve element 11a is disposed in an initial or first position identical to the first or initial position of the rotary valve element 11 of the first embodiment. Accordingly, the fluid flow circuitry as described hereinbefore for the embodiment of FIG. 1 would be the same for the embodiment of FIGS. 16 through 24.

As shown in FIGS. 16 and 23, the lug 124 is provided with an elongated surface 126 which is disposed on a plane vertical or perpendicular to 127 (the upper end) and terminates at radial point 129. The planes of the surfaces 126 and 128 are disposed parallel to the rotational axis of the rotor 11a, in a first or initial position as well as in a second position, respectively. The surfaces 126 and 128 terminate in a rounded edge at each end thereof, as indicated by the numerals 129.

As shown in FIGS. 16, 17 and 18, the rotor or rotary valve element 11a is adapted to be oscillated through a rotary path by means of the actuator, generally indicated by the numeral 130. The actuator 130 is adapted to be moved inwardly from the solenoid cover wall 61 by means of the armature projection 112. When the armature 72 is energized, the actuator 130 will be moved inwardly on a horizontal plane, or to the right as viewed in FIG. 16, and into shifting engagement with the lug 126 on the top end of the valve element 11a. It will be understood that the actuator moves inwardly and outwardly along the straight line 131, and this line is parallel to the surface 126.

The actuator 130 coacts with the lugs 124 and 125 to convert a straight line or linear motion into an oscillating rotary motion. The actuator 130 is shown in detail in FIGS. 19, 20 and 21, and this actuator will be described before continuing the description of its motion transfer to the lugs 124 and 125.

The actuator 130 is substantially rectangular in vertical cross section, as shown in FIG. 19. It is provided with a pair of oppositely disposed vertically extended concave recesses 132 and 133 on the sides thereof, for clearance purposes. The actuator 130 has an overall block-shaped configuration and is provided on the front end thereof with the vertically disposed converging angular surfaces 134 and 135 which terminate in the apex 136. The apex 136 is formed at the outer ends of the two angular surfaces 134 and 135. The rear ends of the angular surfaces 134 and 135 terminate at the juncture points 137 and 138 between these surfaces and a pair of adjacently disposed diverging surfaces 139 and 140. The angular surfaces 134 and 135 and the adjacent secondary surfaces 139 and 140 terminate to form a pocket and are vertically disposed relative to the longitudinal axis of the actuator 130, and these surfaces are also perpendicular to the straight line direction of actuation of the actuator 130 during the operation thereof.

As best seen in FIGS. 16 and 20, the actuator 130 is provided with the transverse slot 141 at the rear end thereof. The bottom surface of the slot 141 is horizontal and the rear wall 142 of this slot is disposed perpendicular to the bottom surface. However, as shown in FIGS. 16, 17 and 18, the surface of the wall 142 is convexly shaped when viewed from the slot 141 and looking towards the rear end of the actuator 130. The slot front wall 143 is tapered upwardly and forwardly relative to the bottom surface of the slot, and it is also formed with a convex curvature from one side of the actuator to the other side of the actuator when the same is viewed from the slot 141 and looking toward the front end of the actuator 130. As shown in FIGS. 16, 17 and 18, the armature projection 112 is adapted to be received in the pusher actuator slot 141 with a clearance so as to permit the actuator 130 to oscillate between the positions shown in FIGS. 16, 17 and 18 during a valve element actuation. The armature projection 112 is adapted to move inwardly and outwardly as shown in FIGS. 16, 17 and 18 and to remain at all times in a position perpendicular to the direction of straight line movement along the line 131.

FIG. 24 shows the pusher actuator 130 operatively mounted in the valve structure of the first embodiment, and disposed in operative relationship relative to the lug 124. As shown in FIGS. 19, 20 and 25, the actuator 130 is provided with an integral inverted T-shaped guide member 144 on the lower side thereof for coaction with a mating inverted T-shaped guide track generally indicated by the numeral 145 in FIG. 25. The T-shaped guide member 144 is provided with the leg portion 146 on the lower end thereof, on which is formed the integral cross head portion 147. The T-shaped guide portions 146 and 147 are adapted to slidably received in the T-shaped slot portions 148 and 149, respectively. The guide leg portion 146 is provided with a flat side portion as 150, on each side thereof, and this flat portion extends from the rear edge of the actuator 130 forwardly for approximately one-sixteenth of an inch to the point 151, as viewed in FIG. 20. The point 151 represents the vertical junction line between the one side flat surface and an adjacent vertical surface which slopes forwardly and inwardly toward the front end of the actuator 130. This sloping surface is indicated by the numeral 152. As shown in FIG. 21, the sloping surfaces 152 converge as viewed from the rear end of the actuator 130.

In operation with the rotary valve element 11a in the initial or neutral position shown in FIG. 16, the actuator 130 would be in the solid line position shown in FIG. 16. When the solenoid 12 is energized, the armature projection 112 or pusher member is moved inwardly, or to the right as viewed in FIG. 16, and it will push the actuator 130 to the position shown in FIG. 17. As the actuator 130 moves inwardly or away from the solenoid housing wall 61, the adjacent rounded corner 129 on the lug 124 will engage the pocket formed on the front end of the actuator by the surfaces 134 and 139 and juncture 137. The actuator 130 will pivot or rock counterclockwise, as shown in FIG. 17, and will continue moving inwardly or to the right as viewed in FIG. 17 until the position shown in solid lines in FIG. 17 is reached. It will be seen that as the actuator 130 is moved to the right, as viewed in FIG. 17, it will pivot or rock about the point 153 which is an imaginary point on the rear end of the actuator. The actuator 130 also moves inwardly along the line of pusher actuation 131. The actuator 130 will be moved inwardly to rotate the valve element clockwise so as to bring the lug surface 128 parallel to the line of actuation 131. The solenoid 12 is then deenergized and the actuator 130 will be moved backwardly, or to the left as viewed in FIG. 17, bringing the left rear corner of the rear flat wall 156 into contact with the solenoid housing and pivoting the actuator clockwise, as viewed in FIG. 17, thereby positioning the actuator on the solenoid cover wall 61 and into the dotted line position shown in FIG. 17 and indicated by the numeral 154. It will be seen that the actuator position 154 is the same as the solid line position for the actuator shown in FIG. 16 before the shifting operation was started. The rotary valve element 11a will remain in the position shown in FIG. 17 to which it has been shifted until the solenoid 12 is again energized and the actuator 130 is moved inwardly to rotate the valve element counterclockwise back to the initial or first position shown in FIGS. 16 and 18. As the actuator 130 moves inwardly, the adjacent rounded corner 129 on the lug 125 will engage the pocket formed on the front end of the actuator by the surfaces 135 and 140 and juncture 138. The actuator rocks about the imaginary point 153 and moves to the solid line position of FIG. 18. The solenoid is then deenergized and the actuator 130 is moved backwardly toward the cover wall 61 until the right corner 157 abuts this wall and pivots the actuator counterclockwise to the dotted line position 158. The distance the actuator moves along the line of actuation 131 is controlled by the stroke of the armature 72.

It will be seen that the motion converting means of FIGS. 16 through 24 may be adapted to provide an interrupted oscillating rotary motion by reason of the particular motion of the actuator 130. The actuator 130 first moves inwardly to rotate the rotor 11a from an initial or first position to a second operative position. The actuator 130 is then moved rearwardly back to its starting position. After a desired, predetermined time interval, the actuator 130 is again moved inwardly, as shown in FIG. 18, and it returns the rotary valve element 11a to its starting position.

It will be understood that the valve structure shown in FIGS. 18 through 24 may be utilized in a series arrangement incorporating a plurality of such means so as to provide any sequence of "on" or "off" condition desired. The apparatus of this second embodiment may also be employed to provide uninterrupted oscillating rotary motion by providing the rotor 11a with a return spring, whereby every time the actuator 130 is moved inwardly, it will always contact the lug 124. In the illustrative embodiment, the rotary element 11a is oscillated through a 30° arcuate travel, and the actuator 130 rotates about the point 153 for a radial distance of approximately 10° on either side of the actuator centerline or line of actuation 131.

Although the actuator 130 has been illustrated and described as being operated by the projection or pusher member 112 on a swinging armature 72, it will be understood that the actuator may be moved inwardly and outwardly along its operative path by any other suitable means. For example, the valve shown in FIG. 2 may be provided with a spring biased manual operator similar to the type employed in the prior art solenoids, whereby the actuator 130 may be manually moved inwardly, and returned outwardly by a suitable spring having one end connected to the valve body and the other end connected to the actuator 130.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a reversing fluid control valve, the combination comprising:
    (a) a valve body having a compartment;
    (b) a valve seat in said compartment;
    (c) a valve element rotatably mounted on said valve seat in said compartment and rotatable between a first fluid flow control position and a second fluid flow control position;
    (d) a plurality of fluid passages in said valve body communicating with a plurality of openings in said valve seat for conveying fluid to and from said compartment under the control of said valve element;
    (e) antifriction means rotatably supporting and centering the valve element in said compartment; and,
    (f) spring means engaging said valve element for maintaining the valve element in seating engagement with said valve seat.

2. In a reversing fluid control valve, the combination comprising:
    (a) a valve body having a compartment;
    (b) a valve seat in said compartment;
    (c) a valve element rotatably mounted on said valve seat in said compartment and rotatable between a first fluid flow control position and a second fluid flow control position;
    (d) a plurality of fluid passages in said valve body communicating with a plurality of openings in said valve seat for conveying fluid to and from said compartment under the control of said valve element;
    (e) anti-friction means rotatably supporting and centering the valve element in said compartment;
    (f) means for rotating said valve element between said first and second positions;
    (g) said means for rotating said valve element including a pusher means;
    (h) means operable by the pusher means and interconnecting the pusher means and said valve element for rotating the valve element;
    (i) means for activating said pusher means;
    (j) said means interconnecting the pusher means and said valve element for rotating the valve element including a pair of spaced apart axially extended members on one end of the rotor;
    (k) an actuator member slidably mounted on said valve body and provided with a pair of laterally spaced apart pockets; and
    (l) said pusher means engaging said actuator for alternately moving one of the pockets on the actuator into a rotary engagement with one of the axially extended members on the rotor for rotating the valve element from said first position to said second position and thence moving the other of said pockets on the actuator into a rotary engagement with said other of the axially extended members on the rotor for rotating the valve element from said second position back to the first position.

3. In a reversing fluid control valve, the combination as defined in claim 2, wherein:
    (a) said means for activating said pusher means comprises a solenoid.

4. In a reversing fluid control valve, the combination as defined in claim 3, wherein:
    (a) said solenoid is provided with a swingable armature and said pusher means comprises said swingable armature.

5. In a reversing fluid control valve, the combination as defined in claim 3, wherein:
    (a) said solenoid comprises a housing;
    (b) an E-shaped core;
    (c) a coil supported by said core and centering said core in said housing;
    (d) a bracket connected to said core and retaining the assembly of the core and coil in said housing;
    (e) said swingable armature being swingably mounted on said bracket; and,
    (f) spring means carried in said core and normally biasing said swingable armature to an inoperative position.

6. In a reversing fluid control valve, the combination as defined in claim 5, wherein:
    (a) said bracket is connected to said core by a roll pin.

7. In a reversing fluid control valve, the combination as defined in claim 5, wherein:
    (a) said core is provided with a shading coil on the inner corner of the outer legs of its E shape.

8. In a reversing fluid control valve, the combination as defined in claim 5, wherein:
    (a) said core is formed from a plurality of laminations secured together by a plurality of roll pins.

9. In a reversing fluid control valve, the combination comprising:
    (a) a valve body having a compartment;
    (b) a valve seat in said compartment;
    (c) a valve element rotatably mounted on said valve seat in said compartment and rotatable between a first fluid flow control position and a second fluid flow control position;
    (d) a plurality of fluid passages in said valve body communicating with a plurality of openings in said valve seat for conveying fluid to and from said compartment under the control of said valve element;
    (e) antifriction means rotatably supporting and centering the valve element in said compartment; and
    (f) a spring means carried on said valve element for maintaining the valve element in seating engagement with said valve seat.

10. In a reversing fluid control valve, the combination as defined in claim 9, wherein:
    (a) said autifriction means comprises a ball bearing means releasably secured to the valve body; and,
    (b) one end of said spring means abutting said ball bearing means and the other end of said spring means engaging said valve element for maintaining the valve element in seating engagement with said valve seat.

11. A reversing fluid control valve as defined in claim 10, including:
    (a) a swingable armature solenoid mounted on the valve body and operatively engagable with said valve element for rotating the valve element between said first and second positions.

12. A reversing fluid control valve as defined in claim 11, including:
    (a) a pair of laterally spaced apart axially extended members on said valve element;
    (b) an actuator slidably and rockably mounted on said valve body and being provided with a pair of laterally spaced apart pockets alternately engageable with said axially extended members on said valve element when the actuator is moved toward said valve element; and,
    (c) said swingable armature being operatively connected to said actuator for moving said actuator into operative alternate engagement with said axially extended members on said valve element for rotating said valve element between said first and second positions.

13. In a reversing fluid control valve, the combination as defined in claim 12, wherein:
    (a) said solenoid is provided with a spring means engageable with said armature for moving the armature and said actuator into an inoperative position disengaged from axially extended members on said valve element.

14. In a reversing fluid control valve, the combination as defined in claim 13, wherein:
    (a) said solenoid comprises a housing;
    (b) a laminated core;
    (c) a U-shaped bracket connected to the core;
    (d) a bracket connected to said core and retaining the assembly of the core and coil in said housing; and,
    (e) said swingable armature being swingably mounted on said bracket.

15. In a reversing fluid control valve, the combination as defined in claim 11, wherein:
    (a) said solenoid comprises a housing;
    (b) an E-shaped core;
    (c) a coil supported by said core and centering said core in said housing;
    (d) a bracket connected to said core and retaining the assembly of the core and coil in said housing;
    (e) said swingable armature being swingably mounted on said bracket; and,
    (f) spring means carried in said core and normally biasing said swingable armature to an inoperative position.

16. In a reversing fluid control valve, the combination as defined in claim 15, wherein:
    (a) said bracket is connected to said bore by a roll pin.

17. In a reversing fluid control valve, the combination as defined in claim 15, wherein:
    (a) said core is provided with a shading coil on the inner corner of the outer legs of its E shape.

18. In a reversing fluid control valve, the combination as defined in claim 15, wherein:
    (a) said core is formed from a plurality of laminations secured together by a plurality of roll pins.

References Cited
UNITED STATES PATENTS

| | | | |
|---|---|---|---|
| 2,344,913 | 3/1944 | Ager | 137—625.21 |
| 2,744,378 | 12/1956 | Mekelburg et al. | 137—625.65 |
| 2,868,497 | 1/1959 | Graham | 251—172 |
| 3,079,951 | 3/1963 | Ludwig | 137—625.12 |
| 3,101,752 | 8/1963 | Martin | 251—315 X |
| 3,203,249 | 8/1965 | Jentzsch et al. | 251—180 X |

ALAN COHAN, *Primary Examiner.*

MARTIN P. SCHWADRON, *Examiner.*

M. CARY NELSON, R. J. MILLER,
*Assistant Examiners.*